3,477,975
PIGMENT DISPERSION COMPRISING AN IRON-CONTAINING PIGMENT OR A NICKEL-CONTAINING PIGMENT DISPERSED IN A LIQUID
Thomas P. Concannon, Drexel Hill, Pa., assignor to E. I. du Pont de Nemours and Company, Wilmington, Del., a corporation of Delaware
No Drawing. Filed Aug. 29, 1966, Ser. No. 575,902
Int. Cl. C09c 3/02; C09d 7/08
U.S. Cl. 260—22
14 Claims

ABSTRACT OF THE DISCLOSURE

There is disclosed a pigment dispersion adapted for use in coloring a film-forming vehicle; the dispersion comprises an iron-containing pigment or nickel-containing pigment dispersed in a liquid; attached to the pigment particles in specified proportions are a certain kind of tertiary amine compound and a polymer having less affinity than said compound for said particles; the weight ratio of said amine compound to said polymer is preferably about 50:1 to 200:1.

---

This invention relates to (a) pigment dispersion compositions, (b) methods of manufacturing such compositions, and (c) paints and other pigmented liquid film-forming compositions which result from mixing pigment dispersions with film-forming vehicles. The invention is especially concerned with the manufacture of pigment dispersions wherein all or part of the pigment component is an iron-containing pigment, a nickel-containing pigment or a blend thereof.

It is well-known in the art that Milori Blue, Prussian Blue, natural and synthetic iron oxide pigments of various colors and other iron-containing pigments are useful in the manufacture of paints and other pigmented liquid film-forming compositions which result from mixing liquid dispersions of such pigments with film-forming vehicles. The same is true of nickel-containing pigments. The term "film-forming vehicle," which is sometimes also referred to in the art as "end-use vehicle," herein means a polymer solution or other liquid film-forming composition to which pigment is added before the composition is formed into a film of the desired color and form. Typical forms of pigmented films are paint films, ink films, adhesive layers, coatings on fabrics and papers and self-supporting films.

A conventional method of employing iron-containing pigments and/or nickel-containing pigments in the manufacture of paints comprises:

(1) Mixing the pigment with a polymer solution or equivalent liquid film-forming material ("pigment vehicle"), (2) Milling the resulting mixture in a pigment dispersing mill until the pigment is in a suitable state of deagglomeration and dispersion in the pigment vehicle, and (3) Mixing the resulting pigment dispersion with a paint vehicle with which the dispersion is "compatible"; that is, with which the dispersion can be blended, and the blend used as a paint, (a) without harmful coagulation of the film-former in either the dispersion of pigment or the paint vehicle, (b) without failure of the film-former of the pigment dispersion to remain intimately blended with the film-former of the paint vehicle during storage of the paint and in the wet and dry films formed therefrom, and/or (c) without undue flocculation or agglutination of the pigment during the preparation and storage of the paint.

The milling efficiency of these prior art dispersions leaves much to be desired. There is a long-standing need in the art for means to obtain faster and more complete deagglomeration of iron-containing pigments and nickel-containing pigments. Moreover, paints made from these prior art dispersions commonly contain a relatively high proportion of adulterating film-former because of the high ratio of film-former to pigment needed in making the dispersion, and because the polymer characteristics that give the best milling performance and dispersion stability (in the pigment dispersion vehicle) differ from those that give the best paint film properties.

There is a particular need in the art for (1) dispersions of relatively coarse and dense iron oxide type pigments in low-viscosity media which can be stored for extended periods of time without losing their utility and wherein any pigment which settles can be readily resuspended by a simple stirring procedure, (2) pigment dispersions as well as paints containing iron blue type pigments (e.g., Milori Blue) which can be stored for extended periods of time without gelatinizing (sometimes referred to as "livering") and which undergo little or no reddish discoloration (known in the art as taking on a "mulberry" tone), and (3) pigment dispersions and paints containing nickel-containing pigments (e.g., C.I. No. 12775) which have improved flocculation resistance and flooding resistance. "Flooding" herein means the tendency of one pigment to orient at the surface of a film formed from the composition in preference to other pigments present in the composition.

Expressed broadly, the pigment dispersion of this invention comprises:

(A) An iron-containing pigment or a nickel-containing pigment (or both) dispersed in a liquid, the particles of pigment (A) having attached thereto (B) A tertiary amine compound and (C) A polymer having less affinity than (B) for the particles of pigment (A), the dispersion containing about 0.000005 to 0.05 gram of (B) and at least 0.0003 gram of (C) per square meter of surface area of pigment (A), said tertiary amine compound (B) being at least one member of the group having the structural Formulas I and II as follows:

(I) 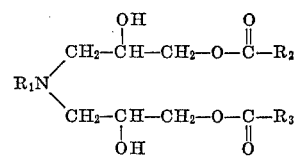

and (II) 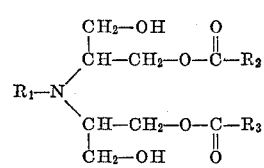

wherein $R_1$ is a radical selected from the group consisting of aryl, alkaryl, and aralkyl radicals containing less than 19 carbon atoms, $C_1$–$C_{12}$ alkyl and $C_4$–$C_7$ alicyclic radicals, and $R_2$ and $R_3$ each contain less than 19 carbon atoms and are individually selected from the group consisting of alkyl, aryl, alkaryl, aralkyl and alicyclic radicals.

The present invention also provides a novel film-forming composition which, in a broad sense, is a blend of:

(D) The pigment dispersion defined in the previous paragraph and (E) A film-forming vehicle.

This invention also provides a novel process for preparing a pigment dispersion employing said pigment A (iron-containing and/or nickel-containig pigment) comprising:

(1) Mixing said pigment (A) with a solution in a liquid of ingredients (B) and (C) as defined above, and (2) Subjecting the resulting mixture to shear in a pigment dispersing apparatus until the pigment is in a suitable state of deagglomeration and dispersion and until at least part of ingredient B and at least part of ingredient C are attached to the pigment, ingredient B having greater affinity than ingredient C for the particles of pigment A in said mixture, said mixture containing about 0.000005 to 0.05 gram of B and at least 0.0003 gram of C per square meter of surface area of pigment A.

A preferred manner of practicing the process described in the previous paragraph comprises performing the following steps in sequence:

(1) Mixing said pigment (A) with a volatile organic liquid which is compatible with the solutions of ingredients (B) and (C) with which the pigment is to be blended, (2) Adding ingredient B (preferably in the form of a solution in a volatile organic solvent) with agitation, (3) adding a volatile organic solvent solution of ingredient (C) with agitation, and (4) Subjecting the resulting mixture to shear as described in the previous paragraph; this can be accomplished in such well-known pigment dispersing mills as sand-grinding mills, roller mills and ball mills.

Useful results are also obtainable when the method described in the previous paragraph is modified so that: (a) steps 2 and 3 are in reverse sequence, (b) the pigment is added to the solution of compound (B) or polymer (C) or a blend thereof, or (c) steps 3 and 4 are in reverse sequence.

A liquid which is a non-solvent for compound (B) can be added after an effective amount of (B) has become attached to pigment (A). The same applies to polymer (C), but in many applications any liquid added to the mixture is preferably a solvent for polymer (C).

According to the best information the inventor has been able to obtain, it is believed that ingredients (B) and (C) are attached to the pigment by adsorption.

Ingredient (A) of the pigment dispersion of the present invention can be any known iron-containing pigment, nickel-containing pigment, or a blend of such pigments. The dispersion can also contain one or more pigment that is free of iron and nickel in combination with the pigment (A) component. Preferred iron-containing pigments include iron oxide pigments and iron blue pigment (e.g., Colour Index No. 77510). Among the useful natural and synthetic iron oxide pigments are those described in "Organic Coating Technology" by H. F. Payne, copyright 1961 by John Wiley and Sons Incorporated, volume 2, pages 816 to 830. Useful iron blue pigments are described in the same book by H. F. Payne on pages 844 to 847.

A preferred nickel-containing pigment is C.I. 12775, a nickel azo complex pigment which can be prepared in accordance with Example 1 of U.S. Patent 2,396,327 issued Mar. 12, 1946 to Kvalnes and Woodward. Other useful nickel-containing pigments are exemplified by nickel titanate yellow (described on pages 836–837 of the book by H. F. Payne mentioned above) and nickel phosphate yellow (C.I. 77783).

Ingredient (B) of the pigment dispersion is a tertiary amine compound having either structural Formula I or structural Formula II as described above. Ingredient (B) can also consist of a blend of compounds having structural Formulas I and II. Ingredient (B) and the preparation thereof are described in greater detail in copending U.S. patent application SN 414,434, filed Nov. 27, 1964 (now abandoned), by J. A. Vasta; the disclosure of this Vasta application is incorporated herein by reference.

In preferred embodiments of the present invention, $R_1$ of ingredient (B) is lauryl and $R_2$ and $R_3$ are branched chain $C_8$ to $C_{10}$ alkyl radicals. Especially preferred as compound (B) is the product obtained in Example 1 of the above-identified U.S. SN 414,434 wherein $R_1$ is lauryl, $R_2$ and $R_3$ are $C_8$ to $C_{10}$ tertiary alkyl radicals, and compounds having both Formulas I and II are present.

Ingredient (C) of the pigment dispersion is a polymer which has less affinity than compound (B) for pigment (A). In some embodiments of the invention, polymer (C) is chemically the same or similar to the polymer of the end-use vehicle; in other embodiments polymer (C) is not chemically similar to the polymer of the end-use vehicle.

An extremely thin layer of compound (B) is in adherence with the surface of the pigment (A) particles, but the amount of (B) present is usually insufficient to cover the entire surface of the pigment (A) particles. Some of polymer (C) must also be attached to pigment (A), either to the portion of the pigment surface not coated with (B) or to the portion coated with (B). There can be polymer (C) attached to both portions. Ingredients (B) and (C) are selected: (1) so that both (B) and (C) are at least initially soluble in a liquid solvent, (2) so that (B) has greater affinity than (C) for the particles of pigment (A) when a composite solution of (B) and (C) is mixed with pigment (A) in accordance with the proportions specified above, and (3) so that both (B) and (C) have sufficient affinity for the particles of pigment (A) to become attached thereto in an effective amount when the composite solution is mixed and/or milled with pigment (A).

In some preferred embodiments, polymer (C) is more soluble than compound (B) in the solvent of a composite solution and is more compatible than (B) with at least one end-use vehicle containing a film-former substantially different from ingredients (B) and (C). It is not essential, however, that either (B) or (C) be compatible with the film-former of the end-use vehicle.

When ingredients (B) and (C) are attached to pigment (A) in the manner described above and are present in their required proportions, they prevent undue flocculation of pigment (A) until, during and after the incorporation of the pigment dispersion into the end-use film-forming vehicle. "Flocculation" occurs when pigment particles aggregate into small flocculent (wooly or "flocky") masses. As is well known in the art, flocculation has a harmful effect on the tinting strength of the pigment.

In some of the more useful embodiments of the invention, about 50 to 100% of (B) is attached to pigment (A) and about 10 to 80% of (C) is attached to pigment (A), the remainder being in solution in the liquid (continuous phase) of the dispersion.

One skilled in the pigment dispersion art, after reading the present disclosure, will have no difficulty in selecting the amount of ingredients (B) and (C) to use with a particular type of pigment (A) component to obtain the best quality dispersion for a given purpose. Generally the amount of (B) and (C) required for a given weight of the pigment will vary directly according to the surface area of the pigment. The best quality of dispersion is usually obtained when the amount of polymer (C) present is greater than the amount of Compound (B). In fact, best results are often obtained when the dispersion contains about 50 to 200 times as much (C) as (B); that is, when the weight ratio of B:C is about 50:1 to 200:1.

The surface area of the pigment can be determined by the "BET" nitrogen-adsorption method described on page 30 of "Colloidal Dispersions" by Earl K. Fischer, published in 1950 by John Wiley and Sons. "BET" stands for Brunauer, Emmett, and Teller. When the dispersion contains more than the maximum amount of (B) and/or (C) that can be attached to pigment (A) in accordance with this invention, the excess can be separated from the pigment by a conventional centrifuge separation method.

The amount of (B) and (C) that becomes attached to pigment (A) in the present method wherein the pigment is mixed with the composite solution (solution of B and C) can be determined by subtracting from the amount of (B) and (C) present in the original solution the amount present in solution form after the pigment is mixed with the solution. The pigment with (B) and (C) attached can be removed in a centrifuge. A convenient method of determining the change in concentration of (B) and (C) in the solution is to measure the change in infrared absorption at characteristic wave-lengths by techniques well-known in the art (e.g., see "Modern Plastics" 38, 123, April 1961—R. R. Stromberg and G. M. Kline, also "J. Phys. Chem." 62, 541, 1958—J. Koral and R. Ullman).

The pigment (A) is in a state of dispersion in a liquid which comprises the volatile or non-volatile solvent of the solution or solutions employed for incorporating ingredients (B) and (C) in the dispersion. "Volatile" designates the capacity of the solvent to volatilize at a temperature below the decomposition temperature of (B) and (C) and other non-volatile components of the pigment dispersion and the film-forming vehicle to which the dispersion is added in the manufacture of a paint or other pigmented liquid film-forming composition. In preparing the pigment dispersion, a liquid (continuous) phase is selected which is miscible with the solvent of the end-use vehicle and which does not coagulate the film-former in the end-use vehicle. There is much published information available on the solubility of polymers in various liquids. A person skilled in the art will have little difficulty in selecting suitable liquids from such known volatile liquids as aliphatic hydrocarbons, aromatic hydrocarbons, ethers, esters, ketones, water and alcohols, and such known non-volatile (high boiling) liquids as butyl benzyl phthalate, octyl diphenyl phosphate, epoxidized soybean oil, di(2-ethyl-hexyl) phthalate, dibutyl sebacate, tricresyl phosphate and the like.

Paints and other pigmented film-forming compositions are prepared by mixing the novel pigment dispersion with suitable end-use vehicles with which it is compatible such as vehicles conventionally used in the art.

The pigment dispersion of the present invention has advantageous utility not only for the manufacture of paints but also for the manufacture of inks, adhesives, and colored film-forming compositions for the preparation of self-supporting films and polymer-coated papers and fabrics.

Advantages which can be realized by using the novel pigment dispersion of this invention include the following:

(1) Useful pigment (A) dispersions are obtainable having an unusually low polymer content; this makes it feasible to manufacture paints containing unexpectedly small amounts of film-former other than the film-former of the end-use vehicle.

(2) Useful pigment (A) dispersions are obtainable having a surprisingly high pigment content. As a result, production economies are realized from the lower quantity of dispersion that must be produced and stored.

(3) Paints are obtainable which have a lower pigment (A) content than paints of the same color (hue, saturation, and brilliance) made with conventional pigment (A) dispersions.

(4) The resulting pigement dispersion and paint manufacturing process are better adapted to automation; for example, the novel dispersion facilitates the attainment of reproducible color from one batch to another.

(5) Pigment dispersions comprising relatively coarse, dense iron-containing pigments (e.g., various iron oxides) are obtainable which are surprisingly resistant to harmful settling of the pigments, any pigment which settles during storage can usually be resuspended by a simple mixing step.

(6) Paints can be made with less than usual amount of driers and retain their drying capacity on extended storage since the driers have little tendency to become attached to the pigment (A) particles.

(7) Pigment dispersions and paints containing Milori Blue and the like are obtainable which are unexpectedly resistant to gelatinizing (livering) and reddish discoloration.

(8) Pigment dispersions and paints comprising nickel-containing pigments are obtainable which have surprisingly little tendency towards flocculation or flooding.

(9) In preparing the novel pigment dispersion, milling efficiency is surprisingly high; for example, it is not uncommon to be able to process more than twice as much of a Milori Blue pigment in a given time on a sand milling apparatus and to obtain a better quality dispersion in comparison with the milling of conventional dispersions of this pigment.

The examples which follow are given for the purpose of illustrating the invention. All quantities shown are on a weight basis unless otherwise indicated.

EXAMPLE 1

A blue pigment dispersion adapted for use in the manufacture of blue paint is prepared according to the following formula:

Formula A

| Ingredient No.: | | Parts |
|---|---|---|
| 1 | Butyl acetate | 3.0 |
| 2 | Aromatic hydrocarbon solvent B.P. 150–190° C. | 24.6 |
| 3 | Tertiary amine [1] | 0.3 |
| 4 | Copolymer of butyl acrylate/styrene/acrylic acid/acrylamide (43.6/43.6/2.3/10.5) [2] | 2.0 |
| 5 | Milori Blue pigment (CI 77510) | 21.5 |
| 6 | Oil-modified alkyd resin [3] | 6.0 |
| 7 | Same as No. 2 | 23.6 |
| 8 | Same as No. 2 | 19.0 |
| | | 100.0 |

[1] The tertiary amine (compound B) product obtained in Example 1 of U.S. SN 414,434 (identified above) containing Formulas I and II as described above wherein $R_1$ is lauryl and $R_2$ and $R_3$ are $C_8$ to $C_{10}$ tertiary alkyl radicals; added as a 10% solution in Ingredient No. 2.

[2] Added as a 55% solution in a 60/40 blend of Ingredient No. 2 and butanol.

[3] A 37% oil-length coconut oil-modified glyceryl phthalate alkyd resin havng an acid number of 10 and a content of unesterified hydroxyl groups equivalent to 5.6% glycerol, added as a 60% solution in Ingredient No. 2.

In preparing Formula A, ingredients 1 and 2 are added to a container equipped with a paddle mixer and mixed for 2 minutes. Then (a) ingredient 3 is added with agitation and mixed for 5 minutes, (b) ingredient 4 is added and mixed for 5 mintues, (c) ingredient 5 is added very gradually with stirring and then mixed for 20 minutes, (d) ingredient 6 is added gradually with stirring and then mixed for 15 minutes, (e) ingredient 7 is added gradually with stirring and then mixed for 20 minutes, (f) the resulting mixture is subjected to shear by means of a sand-grinder type of pigment dispersing mill as descirbed in U.S. Patent 2,581,414 issued Jan. 8, 1952, to Hochberg and U.S. 2,855,156 issued Oct. 7, 1958 to Hochberg, et al., the mixture is given one 7 minute pass through an 8 gallon mill at the rate of 45 gallons per hour, the pigment being under shear for 7 minutes, (g) ingredient 8 is added gradually with stirring and mixed for 20 mintues, and (h) the resulting dispersion is subjected to shear in the manner described in step (f).

In the mixture formed in step (e) above, ingredient 3 (the amine) has greater affinity for ingredient 5 (the pigment) than does ingredient 6 (the alkyd resin), and the mixture contains about 120 parts of the alkyd resin for each part of the amine on a dry basis.

A very uniform and stable dispersion of highly deagglomerated pigment particle in a blend of volatile organic solvents is obtained in step (h). Due to the presence of ingredients 3 and 6, the dispersion is very resistant to flocculation on storage of the dispersion and on mixing the dispersion with paint vehicles. Substantially all of ingredient 3 is attached to the pigment, while a considerable proportion of ingredient 6 is present in unattached (solution) form. The attachment of ingredients 3 and 6 to the pigment is believed to be by adsorption.

The Formula A dispersion has excellent flocculation resistance, milling efficiency, utility with various types of paint vehicles, and resistance to becoming gelatinized and discolored. It is unexpected that the Milori Blue dispersion could be effectively prepared in a sand grinder rather than a ball mill.

EXAMPLE 2

A pastel blue paint adapted for use as an air-drying paint for refinishing automobiles is prepared according to Formula B using the blue pigment dispersion of Example 1. The ingredient are added individually with agitation in the order shown to a container equipped with a paddle mixer.

Formula B

| Ingredient No.: | Parts |
|---|---|
| 1 Solvent blend [1] | 15.7 |
| 2 Oil-modified alkyd resin solution [2] | 56.0 |
| 3 White pigment dispersion [3] | 21.0 |
| 4 Blue pigment dispersion of Formula A | 3.3 |
| 5 Inhibitor [4] | 2.0 |
| 6 Drier [5] | 2.0 |
| | 100.0 |

[1] A 34:66 blend of Ingredient No. 2 of Formula A and an aliphatic hydrocarbon solvent whose boiling range is 140–170° C.
[2] A 50% oil-length oil-modified glyceryl phthalate alkyd resin having an acid number of 19 and a content of unesterified hydroxyl groups equivalent to 2% glycerol; the oil is a 30:70 blend of Chinawood oil and linseed oil; 55% solution of the resin in the solvent blend of (1) above.
[3] Made by mixing 25 parts VM and P naphtha, 10 parts alkyd resin solution as described in (2) above and 65 parts of rutile titanium dioxide, followed by milling for 4 minutes in a pigment dispersing mill as described in Example 1 (step f).
[4] A mixture of 20 parts linseed oil, 40 parts phenolformaldehyde resin, 20 parts xylene and 20 parts aliphatic hydrocarbon solvent B.P. 130–190° C.
[5] A 58% dispersion in mineral spirits of a 29:6:65 blend of cobalt, manganese and lead naphthenates.

The resulting paint can be thinned to suitable viscosity for spray application with the solvent blend of (1) above. The blue paint obtained in Example 2 is relatively easy to produce on a mass-production basis with good color uniformity from one batch to another, this paint is resistant to gelatinizing and discoloration.

EXAMPLE 3

A red pigment dispersion adapted for use in the manufacture of red paint is prepared according to the following formula:

Formula C

| Ingredient No.: | Parts |
|---|---|
| 1 Butanol | 2.0 |
| 2 Aromatic hydrocarbon solvent B.P. 150–190° C. | 20.7 |
| 3 Ethyl hydroxyethyl cellulose, 10% solution in Ingredient No. 2 | 2.5 |
| 4 Tertiary amine (same as No. 3 of Formula A) | 0.8 |
| 5 Oil-modified alkyd resin (same as No. 6 of Formula A) | 6.0 |
| 6 Red iron oxide pigment | 60.0 |
| 7 Aliphatic hydrocarbon solvent B.P. 140–170° C. | 8.0 |
| | 100.0 |

The ingredients are added with stirring in the order shown in Formula C, and the resulting premix is milled for 3 minutes in a sand grinder. A high quality pigment dispersion is obtained. This dispersion is surprisingly resistant to harmful settling of the pigment; any pigment which settles during storage can be resuspended by a simple mixing step. A red paint useful for painting automobiles and farm equipment can be made by adding this pigment dispersion to a clear alkyd or oil-modified alkyd resin vehicle. The pigment dispersions of Formulas A and C both have unexpected beneficial utility with different types of end use vehicles.

EXAMPLE 4

A red paint is prepared according to Formula D using the red pigment dispersion of Example 3. The ingredients are added individually with agitation in the order shown to a container equipped with a paddle mixer.

Formula D

| Ingredient No.: | Parts |
|---|---|
| 1 Aliphatic hydrocarbon solvent B.P. 140–170° C. | 17 |
| 2 Oil-modified alkyd resin solution [1] | 20 |
| 3 Bodied linseed oil | 6 |
| 4 Red pigment dispersion of Example 3 | 15 |
| 5 Calcium carbonate | 13 |
| 6 Zinc oxide | 18 |
| 7 Diatomaceous earth | 10 |
| 8 Drier, 57% solution of manganese naphthenate in mineral spirits | 1 |
| | 100 |

[1] A 50% solution in aliphatic hydrocarbon solvent of a 66% oil-length soybean oil-modified pentaerythritol-phthalic anhydride alkyd resin having an acid number of 8 and a content of unesterified hydroxyl groups equivalent to 2.9% pentaerythritol.

The red paint obtained in Example 4 is relatively easy to produce, and it has good color uniformity from one batch to another, it is useful for painting machinery and farm equipment.

EXAMPLE 5

A yellow pigment dispersion adapted for use in the manufacture of yellow paint is prepared according to Formula E.

Formula E

| Ingredient No.: | Parts |
|---|---|
| 1 Copolymer solution [1] | 40.0 |
| 2 Xylene | 14.2 |
| 3 Tertiary amine (same as No. 3 of Formula A) | 0.8 |
| 4 Yellow iron oxide pigment | 45.0 |
| | 100.0 |

[1] A styrene/glycidyl ester/acrylic acid copolymer (60:29:11) prepared in the manner described in Example 1 of British patent specification 1,009,217 published Nov. 10, 1965; added as a 50% solution in 40/40/20 blend of aromatic hydrocarbon solvent B.P. 150–190° C., xylene and butanol.

The ingredients are added with stirring in the order shown in Formula E, and the resulting premix is milled for 3 minutes in a sand grinder. The dispersion is very resistant to harmful settling of the pigment.

EXAMPLE 6

A yellow paint is prepared according to Formula F using the yellow pigment dispersion of Example 5. The ingredients are added individually with agitation in the order shown to a container equipped with a paddle mixer.

Formula F

| Ingredient No.: | Parts |
|---|---|
| 1 Copolymer solution (same as Ingredient 1 of Formula E) | 35.6 |
| 2 Yellow pigment dispersion of Example 5 | 23.8 |
| 3 Melamine formaldehyde resin, 55% solution in butanol | 29.4 |
| 4 Xylene | 11.2 |
| | 100.0 |

The product of Example 6 is useful for painting household and industrial appliances.

EXAMPLE 7

A green pigment dispersion adapted for use in the manufacture of green paint is prepared according to Formula G.

Formula G

| Ingredient No.: | | Parts |
|---|---|---|
| 1 | Copolymer solution (same as Ingredient No. 1 of Formula E) | 28.20 |
| 2 | Xylene | 9.00 |
| 3 | Aromatic hydrocarbon solvent, boiling range 190–210° C. | 16.71 |
| 4 | Tertiary amine (same as No. 3 of Formula A) | 0.80 |
| 5 | Titanium dioxide | 34.08 |
| 6 | Yellow iron oxide pigment | 10.00 |
| 7 | Phthalocyanine green pigment | 0.91 |
| 8 | Nickel-containing pigment C.I. 12775 | 0.30 |
| | | 100.00 |

The ingredients are added with stirring in the order shown in Formula G, and the resulting premix is milled for 3 minutes in a sand grinder. The dispersion is unusually resistant to flocculation and flooding, it is also very resistant to harmful settling of the pigment.

EXAMPLE 8

A green paint useful as an appliance enamel is prepared by repeating Example 6 except Ingredient No. 2 is replaced with the green pigment dispersion of Example 7. The resulting paint is very resistant to flocculation and flooding.

I claim:

1. A pigment dispersion adapted for use in coloring a film-forming vehicle and comprising:
    (A) a pigment dispersed in a liquid, said pigment being selected from the group consisting of iron-containing pigments and nickel-containing pigments,
    the particles of pigment (A) having attached thereto:
        (B) a tertiary amine compound and
        (C) a polymer having less affinity than (B) for the particles of pigment (A),
    the dispersion containing about 0.000005 to 0.05 gram of (B) and at least 0.0003 gram of (C) per square meter of surface area of pigment (A), and said liquid being at least initially a solvent for B and C,
    said tertiary amine compound (B) being at least one member of the group having the structural Formulas I and II as follows:

(I)
$$R_1N\begin{cases}CH_2-CH-CH_2-O-C-R_2 \\ \quad\quad |\quad\quad\quad\quad\quad\quad\; \| \\ \quad\;\; OH \quad\quad\quad\quad\; O \\ CH_2-CH-CH_2-O-C-R_3 \\ \quad\quad |\quad\quad\quad\quad\quad\quad\; \| \\ \quad\;\; OH \quad\quad\quad\quad\; O\end{cases}$$

and (II)
$$R_1-N\begin{cases}CH_2-OH \quad\quad\quad O \\ \;\;\;| \quad\quad\quad\quad\quad\quad\quad \| \\ CH-CH_2-O-C-R_2 \\ \\ CH-CH_2-O-C-R_3 \\ \;\;\;| \quad\quad\quad\quad\quad\quad\quad \| \\ CH_2-OH \quad\quad\quad O\end{cases}$$

wherein $R_1$ is a radical selected from the group consisting of aryl, alkaryl, and aralkyl radicals containing less than 19 carbon atoms, $C_1$–$C_{12}$ alkyl and $C_4$–$C_7$ alicyclic radicals, and $R_2$ and $R_3$ each contain less than 19 carbon atoms and are individually selected from the group consisting of alkyl, aryl, alkaryl, aralkyl and alicyclic radicals.

2. A dispersion according to claim 1 wherein (A) is an iron oxide pigment.

3. A dispersion according to claim 1 wherein (A) is an iron blue pigment.

4. A dispersion according to claim 1 wherein (A) is the nickel complex of $$Cl-\langle\;\rangle-N=N-\langle\;\rangle\begin{smallmatrix}OH\\ \\HO\quad N\end{smallmatrix}$$

5. A dispersion according to claim 1 wherein $R_1$ of ingredient (B) is lauryl and $R_2$ and $R_3$ are branched chain $C_8$–$C_{10}$ alkyl radicals.

6. A dispersion according to claim 5 wherein (C) is a styrene/glycidyl ester/acrylic acid copolymer.

7. A dispersion according to claim 5 wherein (C) is an oil-modified alkyd resin.

8. A dispersion according to claim 1 wherein said liquid is a volatile organic liquid.

9. A dispersion according to claim 8 wherein said liquid is a solvent for (B) and (C).

10. A dispersion according to claim 1 wherein the weight ratio of B:C is about 50:1 to 200:1.

11. A dispersion according to claim 1 wherein B and C are at least initially soluble in said liquid, B having greater affinity than C for the particles of A when a solution of B and C is mixed with A in an amount sufficient to give the proportions specified in claim 1, and both B and C have sufficient affinity for the particles of A to become attached thereto when said solution is milled with A.

12. As a novel colored film-forming composition, a blend of:
    (D) the pigment dispersion defined in claim 1 and
    (E) a film-forming vehicle.

13. A process for preparing a pigment dispersion comprising:
    (1) mixing a pigment as defined in (A) of claim 1 with a solution in a liquid of ingredients (B) and (C) as defined in claim 1, and
    (2) subjecting the resulting mixture to shear in a pigment dispersing apparatus until the pigment is in a suitable state of deagglomeration and dispersion and until at least part of ingredient B and at least part of ingredient C are attached to the pigment,
    ingredient B having greater affinity than ingredient C for the particles of pigment A in said mixture, said mixture containing about 0.000005 to 0.05 gram of B and at least 0.0003 gram of C per square meter of surface area of pigment A.

14. A process according to claim 13 comprising the following steps in sequence:
    mixing said pigment with a volatile organic liquid which is compatible with the solutions of ingredients (B) and (C) with which the pigment is to be blended,
    adding a volatile organic solvent solution of ingredient (B),
    adding a volatile organic solvent solution of ingredient (C), and
    subjecting the resulting mixture to shear as described in claim 13.

References Cited

UNITED STATES PATENTS

| 2,394,432 | 2/1946 | De Groote et al. | 260—404 |
| 2,558,303 | 6/1951 | Marcot et al. | 106—308 |
| 2,719,133 | 9/1955 | Smith | 106—308 |
| 3,037,875 | 6/1962 | Geiser | 106—308 |
| 3,196,118 | 7/1965 | Peters | 260—22 |
| 3,340,218 | 9/1967 | Magne et al. | 260—31.6 |

DONALD E. CZAJA, Primary Examiner

R. W. GRIFFIN, Assistant Examiner

U.S. Cl. X.R.

106—304, 308; 117—161, 167; 260—16, 23, 29.2, 29.6, 30.6, 31.6, 31.8, 32.6, 32.8, 33.2, 33.4, 33.6